United States Patent [19]

Dethloff et al.

[11] 3,828,128

[45] Aug. 6, 1974

[54] MANUAL INPUT DEVICE FOR DATA-PROCESSING SYSTEM AND THE LIKE

[76] Inventors: Jurgen Dethloff, Elbchaussee 239, Hamburg; Wilfried de Beauclair, Am Oberfeld 13, Darmstadt, both of Germany

[22] Filed: Apr. 18, 1972

[21] Appl. No.: 245,170

[30] Foreign Application Priority Data

Apr. 20, 1971 Germany .......................... 2119124

[52] U.S. Cl. ...... 178/18, 235/61.12 R, 340/146.3 Z

[51] Int. Cl. ............................................ H04n 1/00

[58] Field of Search ......................... 178/18, 19, 20; 340/146.3 SY, 146.3 Z, 365 S, 365 L; 235/61.12 C, 61.12 N

[56] References Cited

UNITED STATES PATENTS

| | | | |
|---|---|---|---|
| 3,127,588 | 4/1964 | Harmon | 178/20 |
| 3,399.401 | 8/1968 | Ellis et al. | 178/18 |
| 3,470,359 | 9/1969 | Esterly | 235/61.12 R |
| 3,535,447 | 11/1967 | Wollrich | 178/19 |
| 3,590,158 | 7/1968 | Pabst | 178/18 |
| 3,627,935 | 12/1971 | Spievak | 340/365 S |
| 3,633,180 | 11/1969 | Pabst | 178/19 |
| 3,644,671 | 10/1968 | Scarbrough | 178/18 |
| 3,697,687 | 12/1970 | Larson | 178/18 |
| 3,705,956 | 1/1971 | Dertouzos | 178/18 |

*Primary Examiner*—Thomas A. Robinson
*Attorney, Agent, or Firm*—McGlew and Tuttle

[57] ABSTRACT

The device includes a data carrier having plural character fields, and a plurality of electrical leads extend in spaced, uniplanar parallel relation longitudinally across all of the character fields. First and second signal voltage generators generate two different respective signal voltages representing the binary code 0 and 1. A predetermined number of the leads are divided into first and second leads connected, respectively, to the first and second signal generators. The relative positions of the predetermined number of leads are interchanged, transversely of each field and transversely of the leads, so that, in each character field, the first and second leads are arranged in a different respective order transversely of the associated field to define a respective binary code characteristic of only the associated character field. An electrically conductive code detector or, preferably an electrically conductive stylus, is galvanically engageable directly and discretely with all the first and second leads in a character field to scan the same in a bit-serial sequence to provide, at the output of the code detector, a binary coded data signal respective to the scanned character field. One of the leads is a "start" lead and another lead is a "stop" lead. When a control switch is closed, the start lead is energized with a d.c. voltage, and activates the first and second signal generators, as well as connecting the code detector, such as the stylus, to a shift register and a parity check in the form of a binary counter. When the "stop" lead is contacted by the code detector, it deactivates the first and second signal generators and, if the number of 1 pulses is equal to a predetermined number, the parity check effects actuation of first and second voice frequency generators and a clock generator is activated to read out the shift register to selectively supply the voice frequency generator signals to a loudspeaker or the like in accordance with the scanned binary code.

17 Claims, 3 Drawing Figures

MANUAL INPUT DEVICE FOR DATA-PROCESSING SYSTEM AND THE LIKE

The present invention relates to a data collection system, and more particularly to a manual input device for the use in such systems.

Due to the novel design principles and equipments, data processing systems have reached a high level as regards efficiency and possible applications, with a continuously improving price-performance ratio. The prerequisite therefor, however, namely the data collection and data input, still employs the same old methods as during the early stages, which are unbearably expensive with respect to many important fields of practical application, namely card and tape perforators, keyboard-controlled typewriting and printing machines, requiring costly special machinery for effecting the data input, or with the aid of key-controlled magnetic-tape utility inscribing or printing apparatus. None of these equipments can be carried, without further ado, to the continuously changing data source locations. Simple types of manual card perforators, of course, may be transported, but these portable perforators provided only minor efficiencies. Other portable input devices, such as key- and/or knob-operated magnetic tape cassette-type apparatus, are likewise too expensive for permitting general use.

Conventional types of data-collection keyboards which are used in connection with printing, perforating or otherwise recording apparatus for preparing data-recording media or for the direct input via trunk lines, when in the conventional mechanical type of construction, are relatively expensive and susceptible to interferences, and when in the modern contact-less design employing purely electronic keys, of course, are more reliable but also not of such low cost as would be desirable.

Therefore, it is a requirement, with respect to many cases of practical application, to provide a simple manual input device. With respect to particular problems it has become known, for data-collection and data-input purposes to provide a printing plate which is divided into conductive coordinate-points suitable for being acted upon capacitively with the aid of a suitable pen or stylus. By suitably touching arbitrary points of the grid pattern, therefore, it is possible to represent any arbitrary figures, dashes, and the like in the form of an analog grid pattern which can be made visible, for example, on the screen of a display unit.

On the same principle there also operates a conventional device for following arbitrary figures, hence also for the printing or recording of letters and figures. In the course of this, the position of the stylus, which is provided with a pressure contact at its point end, within the two-dimensional grid pattern, is electromagnetically converted into a 10-bit code for each of the axes of coordinates.

The principle of sweeping a data carrier (data recording medium) with the aid of a correspondingly conductive pen (stylus) has also already been used for producing sequences of serial voice frequencies, with the pen (stylus) being provided with a spring-supported current-switching point end by which the character fields are touched.

Moreover, it is known to effect the optical sweeping of the binary code of product labels with the aid of a light pen. Input devices have also already been proposed for magnetic reading, and in which the magnetic head is moved by hand over the code markings.

All of these conventional devices, however, have the disadvantage of being not easy to handle or that a direct digital-code input is impossible.

SUMMARY OF THE INVENTION

The present invention now makes use of the principle known per se, for providing a manual input device in that, with the aid of a correspondingly designed stylus and data carrier (printing plate) there is effected the sweeping, but proposes a more simple solution for generating, in particular, digital-code input signals. Accordingly, the invention relates to an input device for data-processing systems or the like providing for a manual sweeping of the data carrier with the aid of a stylus which is correspondingly connected to the processing system for effecting the input of the sweeping signals.

The basic idea of the invention resides in the fact that the data carrier comprises character fields in each of which there is provided a respective pattern of electrically or optically perceivable leads determinative of the respective character, with these patterns corresponding to the binary code of the respective character. These patterns are swept or followed by means of the stylus for the purpose of generating digital signals. The character fields may be arranged in several rows on the data carrier, e.g., similar to the keyboard of a typewriter, or in alphabetic order.

The invention is in no way restricted to the successive sweeping of the leads, but in fact basically also permits the simultaneous sweeping of all leads by means of a correspondingly designed stylus. In some cases of practical application it may also be of advantage to perform the sweeping of the character fields partly in a parallel and partly in a serial manner.

The sweeping may be carried out either optically or electrically. Galvanic sweeping is advantageous and, for galvanic sweeping, the data carrier will be provided with a corresponding conductor board and the stylus will have an electrically-conductive point at one end.

Moreover, it is appropriate to choose all character fields to have the same number of conductor leads, with the individual characters being distinguished in that the conductor leads are acted upon by different voltages in accordance with the binary code of the respective character, i.e., in accordance with the binary "0" or "1". Apart from this it is suitable, as in the case of the teleprinter code, to form start and stop signals by providing in the pattern one additional start-and stop-conductor lead.

It is also of advantage to apply the voltages to the code-conductor leads only after the respective character field has been swept, which may be controlled e.g., by the start conductor lead. By this there can be avoided, in the case of improperly starting the operation of sweeping or following the conductor leads, the providing of mutilated code signals. By means of the end signal as obtained from the stop conductor lead, in combination with a parity check, it will be safe-guarded that any sweeping or following operation, which is terminated too early, will not provide a code sequence which is too short. Both errors may be indicated with the aid of a warning lamp on the printing plate or on the holding arrangement thereof.

Since the length of a line which can be drawn easily and reliably by hand is limited, and since also the entire printing plate should not exceed the size of a normal business letter, the conductor leads in the character fields must lie close to one another. In order to avoid, during the course of sweeping or following operations carried out with the conductive stylus, two adjacent conductor leads being touched simultaneously, which would be the cause of superpositions, insulating separating leads are appropriately provided between the conductor leads.

For effecting galvanic sweeping, the stylus is provided with a current-conducting point at one end, by which the sweep signals are conducted to the subsequently arranged circuit. Instead of the stylus, however, it is also possible to use a stamp-like sweep pen. This stamp, for sweeping a character, is placed into the cover plate section of a character, and is activated, e.g., pressed like a key on to the printing plate.

The resulting vertical movement in relation to the printing plate releases, inside the stamp, a process for redirecting this movement, e.g., by 90°, thus effecting the successively following establishment of the contact between a conductor, arranged inside or on the bottom side of the stamp, and the conductor leads.

In cases where the conductor leads are to be subjected to parallel sweeping, this diversion of movement may be omitted and the stamp may be so designed that all conductor leads are seized or swept simultaneously. This may be effected e.g., by means of respective spring contacts each associated with one conductor lead.

The printing plate itself may preferably be designed as an etched conductor board provided with one of the conventional types of board-mounted (male) connectors. It is thus easily interchangeable in case it has to be removed as the result of wear, or in cases where other code representations are desired. Via the connector, signals associated with the binary 0 and 1 are applied to the individual conductor leads.

In cases where the printing plate serves to operate a printing mechanism of the page-printer type connected firmly or in the plug-in manner, the two binary values can be preferably represented by voltage values. However, if data collection is aimed at transmitting the data via telephone lines, preferably two different voice frequencies are fed in. Conversion into voice frequencies may also be effected in a subsequently arranged subassembly group.

For enabling a better usage, the printing plate including the etched conductor leads which, preferably, and for the purpose of preventing oxidation, are gold-plated, may be provided with a cover plate comprising openings or recesses by which it becomes accessible for the stylus only at the actual points of writing. These cutout portions are appropriately designed to extend in a slightly inclined fashion from the rear to the front (backward to forward) corresponding to the movement of the hand. Moreover, these cutout portions not only serve to guide the stylus, but also as a protection against soiling of the conductor board. The cutout portions may also be conically designed at their edges, i.e. the opening of the cutout portion is somewhat more narrow towards the conductor board. When using a printing stamp, this will effect, in particular centering of the stamp so to speak automatically when pressed down, thus causing the sweeping or following of the conductor leads of a character to be carried out in a defined way and relieving the sampling operation from any possible individual peculiarities of the user.

For meeting the requirements in quite a number of practical applications of the printing plate, e.g., for credit purchases or the readout of information from data storages which may be carried out only by specially authorized persons, either the stylus or the printing stamp may be of the plug-in type. They may be carried about in the pockets of the users. For identifying the authorized user, identifying circuits of the type known per se may be accommodated in the stylus or in the printing stamp, respectively. With the aid of a simultaneously identifying stylus or printing stamp, it is possible to design, e.g., devices or arrangements for credit purchasing, for example on cash registers, substantially more inexpensive from both the technical and the economical viewpoint than would be possible with the aid of the hitherto conventional types of arrangements.

One advantageous further embodiment of the invention will result when the input device is designed in such a way that the data carrier, designed as a printing plate, is made interchangeable. In that case printing plates for various fields of practical application may be provided, i.e., with groups of different characters or symbols, for being randomly inserted in the input device. Such interchangeable-plate systems are, e.g., known per se from the fields of aircraft seat booking or reservation systems. The plates as such are provided with identifications which become effective, upon insertion of the plates in the input device, for identifying the respective plate in the processing unit.

It is also possible to arrange only one printing plate which itself is of the non-interchangeable type, but to provide interchangeable cover plates differing from one another in such a way as to comprise different groups of characters or symbols. Moreover, these cover plates may be provided with cutout portions which are in congruence with the cutout portions positioned over the character fields of the printing plate, so that the character fields lying therebeneath can be swept or followed by the stylus. For identifying the respective cover plate, the latter may comprise preselection fields resembling the character fields of the conductor board but which, in dependence on the respective cover plate, are either provided with different conductor leads or are arranged at different points of the cover plates. The preselection fields then serve to identify the respective cover plate so that, by sweeping it prior to the actual sweeping operation, the processing unit can be switched on accordingly.

The characters on the conductor boards or cover plates, respectively may include not only letters and figures, as for instance in the case of typewriter keyboards, but may also consist of symbols of any possible arbitrary kind, each of which has a very distinct meaning or represents complete sentences. Thus, for example, the stylized symbol showing a "palm-tree" may have the meaning of a "Trip to the South."

BRIEF DESCRIPTION OF THE DRAWINGS

In the following the invention will now be explained in greater detail and by way of example with reference to FIGS. 1 to 3 of the accompanying drawings, in which.

BRIEF DESCRIPTION OF THE PREFERRED EMBODIMENT

Figure 1:
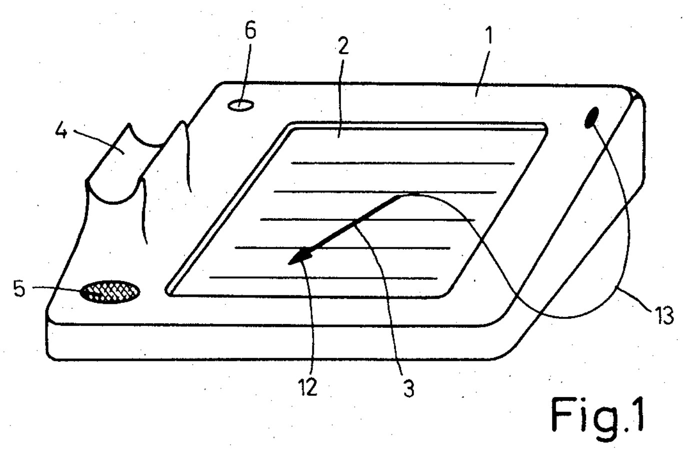
FIG. 1 is a top view of the input device together with the printing plate.

FIG. 1 shows the novel input device in a diagrammatic representation. The device consists of the housing 1 with the conductor board 2, which is covered by a cover plate and which is interchangeably plugged into a corresponding frame of the housing. The housing 1 accommodates the subassembly groups or units for the power supply, the plug for the stylus 3, as well as the circuits for generating the input signals. Moreover, besides the housing 1 there is arranged a warning lamp or indicator 6 which is lit whenever a character has not been swept or followed properly, thus indicating that the respective code signal has been generated in a mutilated fashion, simultaneously preventing the transfer thereof. The stylus 3 is provided with a current-conducting point end 12 and with an insulating handle, and is connected to the housing by way of the flexible cord 13.

Figure 3:
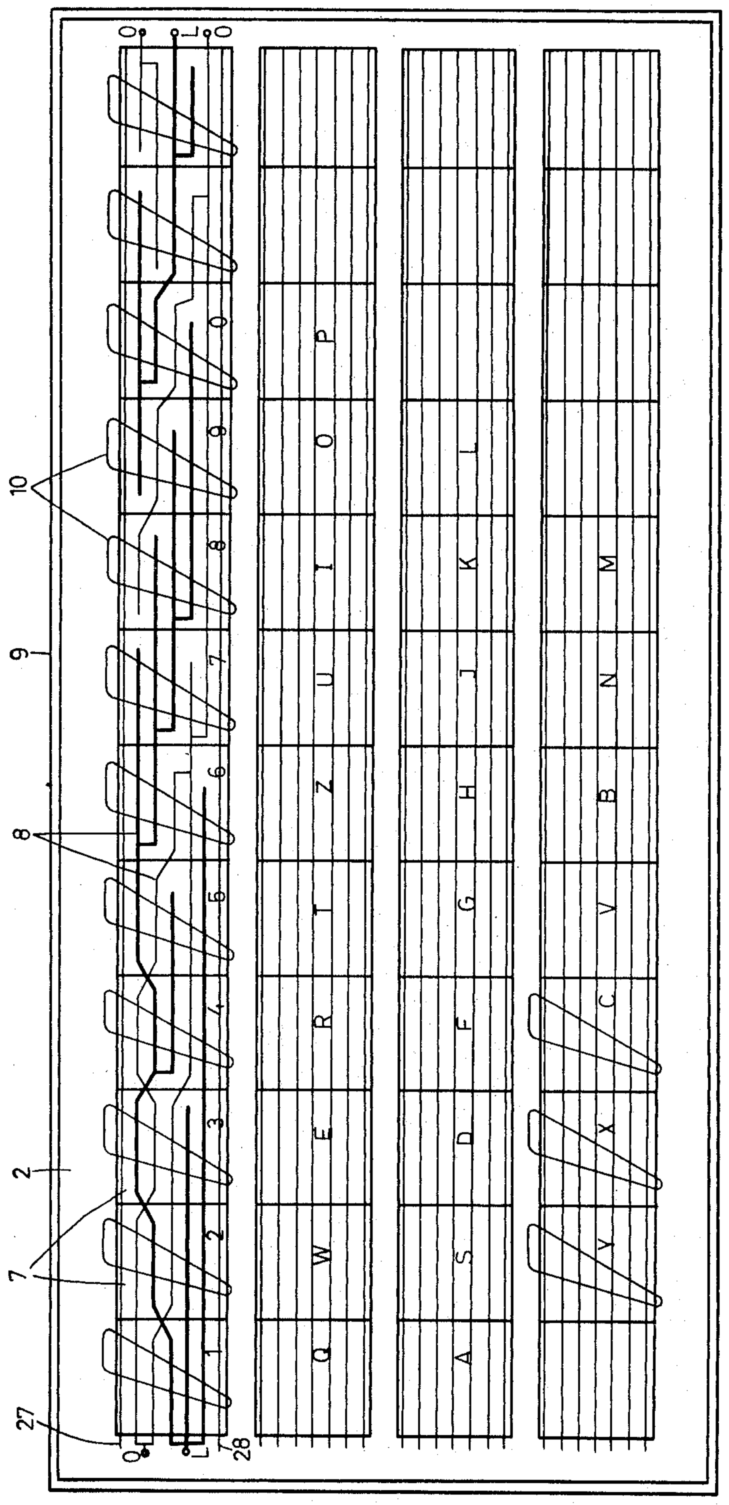
FIG. 3 is a plan view of the contact field of the printing plate for producing a 3-out-of-5 code.

FIG. 3 illustrates the construction of the printing plate 2. It contains four rows of character fields 7. Each character field comprises five equidistant conductor leads 8. When these conductor leads 8, in accordance with the code of the respective character and for representing the binary 0 and 1, are acted upon by different voltages, the conductor leads of the individual character fields must be connected to the voltage sources in accordance with the code. This is shown with respect to the top row of characters, based on the assumption that a 3-out-of-5 code is being used.

Over the conductor board 2 there is arranged a cover plate 9 having cutout portions 10 through which the conductor leads 8 may be touched with the aid of the stylus 3. The cover plate 9 consists of a thin scratch-resistant material and is bonded on its entire surface to the conductor board in an insulating manner for preventing, amongst others, the penetration of humidity. Moreover, this cover plate, apart from the cutout portions 10, also carries the associated character pattern, i.e., the figures, letters and other symbols. In the present example the arrangement of the characters is made to resemble the keyboard of a typewriter. For enabling a better understanding and review, the cover plate 9 is shown to be transparent, and only some of the cutout portions 10 are illustrated. These cutout portions 10 may be so designed as to become narrower towards the conductor board.

The conductor leads providing the start signal are indicated by the reference numeral 27, and those providing the stop signal are indicated by the reference numeral 28.

Figure 2:
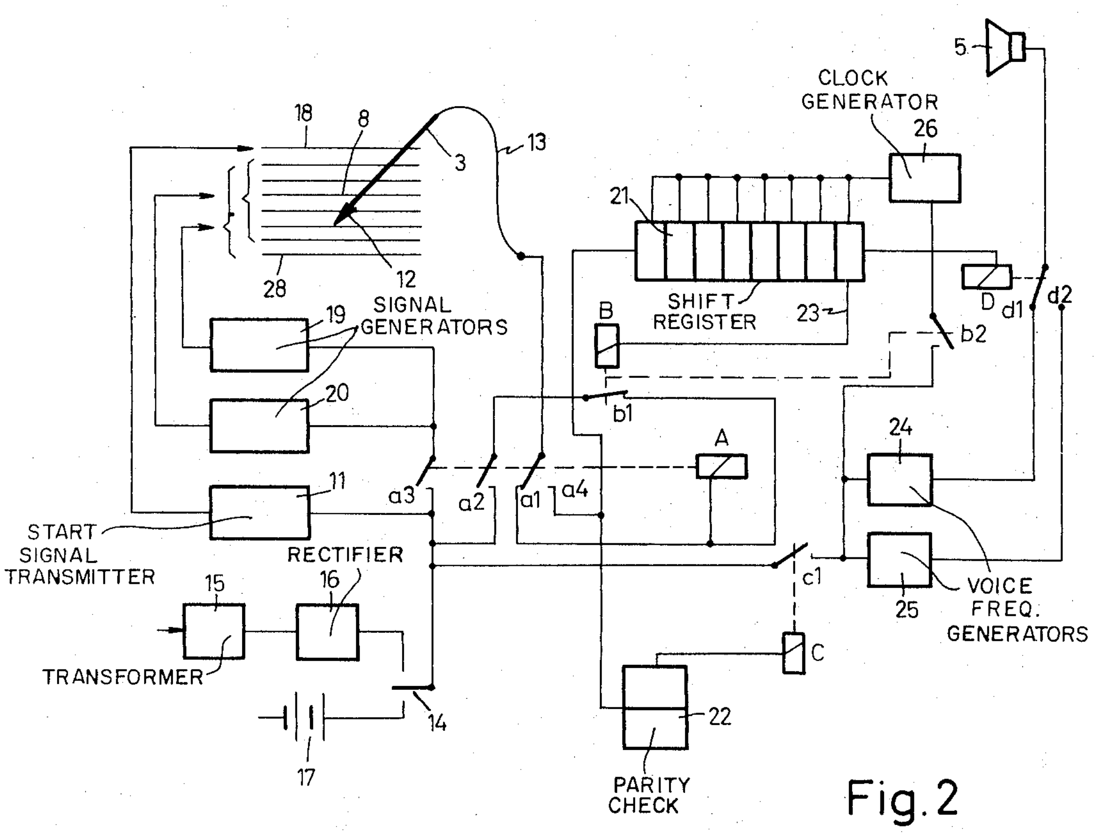
FIG. 2 is a schematic circuit arrangement for generating the input signals.

FIG. 2 shows the circuit arrangement for generating the input signals, in which case it is assumed that voice-frequency signals are to be transmitted. For this purpose, FIG. 1 shows that housing 1 is provided a receiver rest 4 for the handset of a telephone, with the adaptor thereof being placed on the loudspeaker 5 as sound-proof as possible.

The apparatus is switched on by means of the switch 14, with the power supply being derived either from the mains voltage, via the transformer 15 and the rectifier 16, or from the battery 17. The top conductor lead 18 (start lead 27) thus has voltage applied thereto. When sweeping now with the stylus 3 from top to bottom over the character field 7, a start signal is generated by means of the conductor lead 18 connected to the start signal transmitter 11, with this signal being supplied from the stylus 3, via the conductor cord 13 and the closed contact a1, to the relay A, thus causing the latter to transfer. Owing to this, the supply voltage is switched, via the contact a2 and the break contact b1 of relay B, to the coil of relay A, so that the latter remains energized. At the same time, via the contact a3, supply voltage is also applied to the two signal generators 19 and 20 with respect to the two different voltages of the binary 0 and 1. In this way the conductor leads 8 in each character field are provided with different voltages corresponding to the code of the respective character.

Thereafter, in the course of sweeping the character field, all of the conductor leads 8 are swept or followed by the stylus 3, with the pulses, generated in the course of this, being applied, via the contact a4, to the shift register 21 and the parity-check device 22. After all of the conductor leads 8 including the stop-lead 28 have been swept, the shift register 21 is in the state of being completed. Thus, the output signal of the last stage, via the line 23, is applied to relay B which is caused to transfer, so that its contact b1 is opened, thus interrupting the hold circuit for relay A. The conductor leads 8 are now again without voltage.

The parity-check device 22 serves to count the binary 1's in a binary counter and to energize the relay C when the number of binary 1's has become even. Thus, via the contact c1, supply voltage is applied to the two voice-frequency generators 24 and 25. Supply voltage is also fed to the clock generator 26 after the contact b2 has been closed, i.e., only in cases where the code of a character has been stored completely into the shift register 21 and "even" has resulted from the parity check.

The clock generator 26 now effects the readout of the shift register contents via the relay D which, in the case of the binary 0, via the contact d1, switches the voice-frequency generator 24 and, in the case of a binary 1, via contact d2, switches the voice-frequency generator 25, to the loudspeaker 5. Accordingly, the loudspeaker 5 radiates a sequence of two sounds corresponding to the binary code of the swept character.

For the purpose of effecting the long-range transmission of the data collected with the apparatus, the handset of a telephone station is placed with its microphone over the loudspeaker 5, after the desired connection to the data receiver has been dialled and established.

The code in the form of voice-frequency sequences, apart from the long-range transmission, is also particularly well suitable for being stored on a magnetic tape, from which it may be read out for the purpose of effecting the long-range transmission.

In cases where the data collection system is intended to serve purposes where emphasis is not placed on the absolute reliability of the coding, because any possible printing or typing errors will be recognized analogously in a connected print unit supplying plain text, there may also be omitted the parity check and the circuit for converting the signal voltages into a sequence of voice frequencies, arranged subsequently to the printing plate, and instead of this the conductor leads may be supplied directly with the voice frequencies. The voice frequencies, as switched on by the start lead, may be switched off again by the action of the end signal. At the same time there may be switched on a short-lasting actuation signal for indicating to the operator that the character field has been swept over correctly and completely.

While a specific embodiment of the invention has been shown and described in detail to illustrate the application of the principles of the invention, it will be understood that the invention may be embodied otherwise without departing from such principles.

What is claimed is:

1. In an input device for data-processing systems and the like of the type in which a data carrier is scanned manually by a code detector having an output connected to a data utilizing device, such as the processing system or a storage device, for supplying data input signals thereto, the improvement comprising, in combination, said data carrier including plural character fields longitudinally aligned in at least one row and having respective scanning areas extending transversely of the associated row; a plurality of electrical conductor leads extending in spaced, uniplanar parallel relation longitudinally across said character fields in a row and connected to respective sets of terminals at the ends of the row; first and second signal voltage generators generating two different respective signal voltages representing the binary code 0 and 1 respectively; a predetermined number of said leads being divided into first leads and second leads, and said first and second signal generators being connected to the terminals of said first and second leads, respectively; the relative positions of said predetermined number of leads being interchanged, between the scanning areas of adjacent fields, transversely of each field and transversely of the leads, so that, in each character field, said first and second leads are arranged in a different respective order transversely of the associated field to define a respective binary code characteristic of only the associated character field; said code detector being an electrically conductive member galvanically engageable directly and discretely with all the first and second leads in a character field to scan the same in a bit-serial sequence to provide, at its output, a binary coded data signal respective to the scanned character field.

2. An input device, as claimed in claim 1, in which said data carrier is a planar conductor board having said conductor leads; said code detector being an electrically conductive stylus.

3. An input device, as claimed in claim 2, in which all of said character fields include the same number of first and second conductors corresponding to the bit number of the employed code.

4. An input device, as claimed in claim 3, including a counting device connected to the output of said stylus and counting the output pulses for each scanned character field to check proper scanning of the character field by said stylus.

5. An input device, as claimed in claim 4, including, in addition to said predetermined number of leads, a first additional conductor lead operable to generate a start signal upon galvanic contact with said stylus, and a second conductor lead operable to generate a stop signal upon galvanic contact with said stylus.

6. An input device, as claimed in claim 5, including a main control switch operable to connect said device to a source of d.c. potential; said main control switch connecting said start signal conductor lead to said source responsive to closing of said main control switch and switch means operable, responsive to engagement of said start signal conductor lead by said stylus, to activate said first and second signal voltage generators to apply said respective signal voltages to said first and second leads.

7. An input device, as claimed in claim 6, including a shift register and a binary counter connected in parallel to the output of said stylus responsive to engagement of said stylus with said start signal conductor; said shift register having a number of positions corresponding to the number of positions of the employed binary code; said binary counter counting the number of binary 1s.

8. An input device, as claimed in claim 7, including insulating leads interposed between said electrical conductor leads to separate the same from each other in each character field.

9. An input device, as claimed in claim 8, including a cover plate overlying said conductor board and said electrical conductor leads; said cover plate having cutout proportions defining the scanning area each character field and serving to guide said stylus in scanning the associated character field.

10. An input device, as claimed in claim 9, in which said character fields are arranged in parallel rows extending longitudinally of said conductor board; said cutout portions slanting to the left from the rear to the front of said conductor board.

11. An input device, as claimed in claim 9, in which said cutout portions decrease in lateral dimensions inwardly of said cover plate toward said conductor board.

12. An input device, as claimed in claim 2, in which said stylus is designed for plugging in to said input device; and identifying means for identifying the user of said input device, said identifying means being capable of being checked in the apparatus.

13. An input device, as claimed in claim 1, in which said character fields are arranged in the manner of a typewriter keyboard.

14. An input device, as claimed in claim 1, in which said character fields are arranged alphabetically in plural rows.

15. An input device, as claimed in claim 1, in which said character fields have assigned thereto arbitrary meanings, symbols, and the like.

16. An input device, as claimed in claim 2, including plural said conductor boards interchangeably cooperable with said input device, and having respectively different groups of characters associated therewith; and means operable, responsive to insertion of a conductor board into said input device, to activate the conductor board and to identify the same.

17. An input device, as claimed in claim 8, including plural said cover plates each associated with different groups of characters and said cover plates being interchangeably positioned over said conductor board; each cover plate having cutout portions which are in congruence with the scanning areas of the character fields of said conductor board; said cover plates being provided with preselection fields identifying said cover boards; said preselection fields being operable to be swept by said stylus prior to scanning of said character fields.

* * * * *